Aug. 19, 1924.
H. M. WARNOCK
MOTOR BOAT
Filed Oct. 30, 1922
1,505,113
2 Sheets-Sheet 1
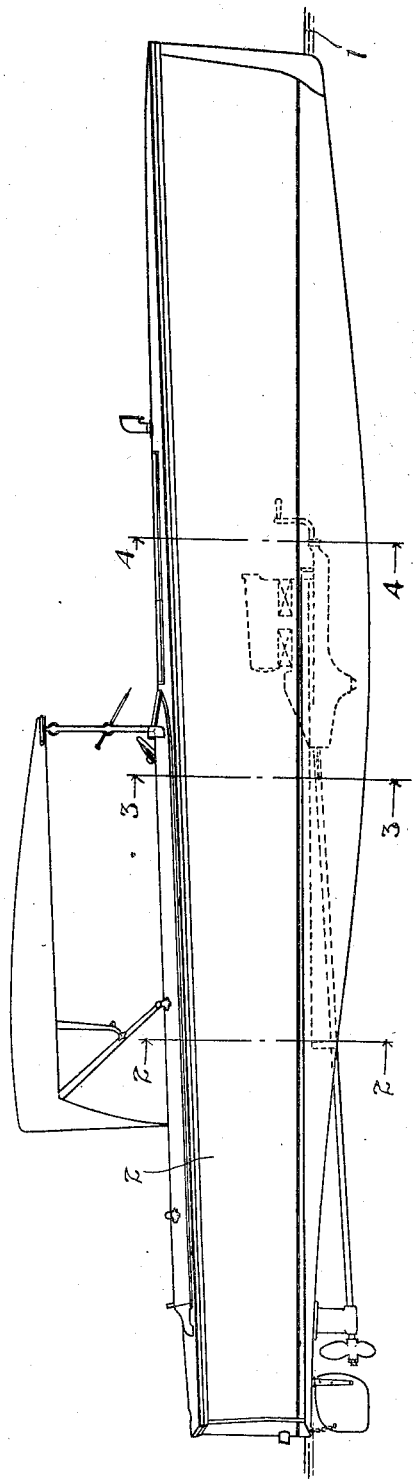
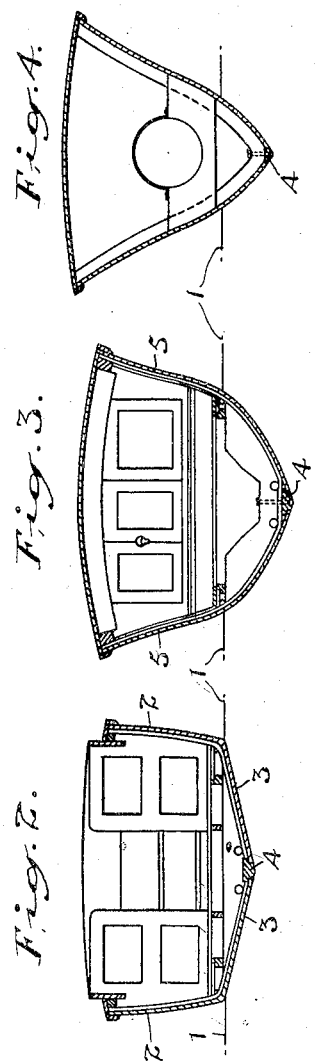
Inventor
Hugh Milton Warnock
by A. J. S. Dennison
Atty.

Aug. 19, 1924.

H. M. WARNOCK

MOTOR BOAT

Filed Oct. 30, 1922

*Inventor*
Hugh Milton Warnock
by H. J. S. Denison
  att.

Patented Aug. 19, 1924.                                                                 1,505,113

UNITED STATES PATENT OFFICE.

HUGH MILTON WARNOCK, OF PENETANGUISHENE, ONTARIO, CANADA, ASSIGNOR TO GIDLEY BOAT COMPANY, LIMITED, OF PENETANGUISHENE, ONTARIO, CANADA.

MOTOR BOAT.

Application filed October 30, 1922. Serial No. 597,993.

*To all whom it may concern:*

Be it known that I, HUGH MILTON WARNOCK, a subject of the King of Great Britain, and resident of the town of Penetanguishene, county of Simcoe, Province of Ontario, in the Dominion of Canada, have invented certain new and useful Improvements in Motor Boats, described in the following specification and illustrated in the accompanying drawings, that form part of the same.

The principal objects of the invention are, to enable the placing of a motor car engine within a motor boat, and to devise a construction of hull which will be extremely seaworthy and responsive to control.

The principal feature of the invention consists in the novel construction of the hull, in which the line of the keel is depressed intermediate of the length of the hull to a point considerably below the bow and stern ends, whereby accommodation for the engine is provided and whereby a central pivot for the boat is formed, the after end being so shaped as to swing side-ways with the minimum resistance, the bottom thereof being formed with plane surfaces.

In the drawings, Figure 1 is a side elevational view of my improved construction of motor boat.

Figure 2 is a cross section through the line 2—2 of Figure 1.

Figure 3 is a cross section through the line 3—3 of Figure 1.

Figure 4 is a cross section through the line 4—4 of Figure 1.

Figure 5:
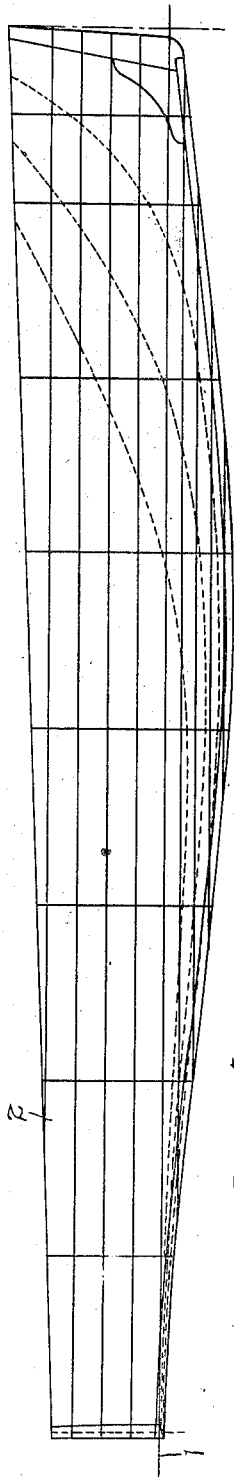
Figure 5 is a side elevation line plan of the hull.
Figure 6:
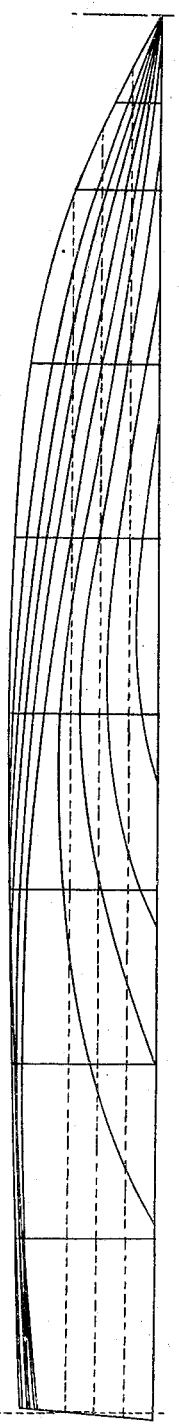
Figure 6 is a bottom line plan.
Figure 7:
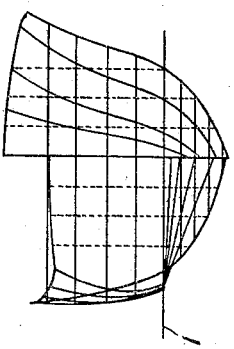
Figure 7 is an elevation of the line plan.

In the hull here shown the water line 1 forms a distinct line of demarcation between the side wall and the bottom for the major portion of the length of the hull.

At the after end the side walls 2 are practically straight and perpendicular to the water and the bottom is formed of two planes 3 which slope slightly upward from the keel 4 to meet the sides 2 at the water line. The keel slopes downwardly and forwardly to about amidships and the plane surfaces extend forwardly and at about amidships are rounded to meet the inward curve of the side walls 5 which from slightly above the water line flare outwardly to the gunwale. From amidships the keel curves upwardly to the prow and the bottom recedes in a gradually narrowing V-shaped formation rising almost to the water line and merging with the sheer.

From this description it will be seen that the hull has its deepest portion about amidships and with the after end formed with flat plane surfaces arranged at a very slight inclination from the horizontal, the turning of the boat is effected through a swing practically about the centre, both the forward and after ends offering less resistance to the water than the central portion.

This deep central portion as before stated provides ample room for the engine without the engine being mounted too high or at too steep an angle to enable proper lubrication and to allow direct connection to the propeller shaft.

This construction enables the hull to be placed in practically a horizontal position, thus ensuring the maintenance of a uniform distribution through its oiling and cooling systems.

A further feature in constructing the hull as described is that the plane surfaced after end together with the low amidships portion prevents the downward sag or tip of the stern of the boat which is very common to boats of this class particularly where the speed is raised beyond normal, whereas with the present hull an increase in speed only results in the lifting of the rear end of the hull farther out of the water in practically a horizontal plane.

What I claim as my invention is:—

1. A motor boat having a bottom sloping downwardly from bow and stern to amidship and convexedly curved in cross section in the forward portion, said bottom presenting plane surfaces at the after end sloping slightly downward from the water line to keel.

2. A motor boat having its deepest section amidship with the keel sloping upward to bow and stern to substantially the water line, the bottom at the after end sloping upwardly from the keel to the water line in plane surfaces and the major portion of the remainder of the bottom being curved convexedly from the water line to the keel.

3. A motor boat having the after end of the hull formed with substantially perpendicular sides and a bottom formed of two plane surfaces sloping slightly upward from the keel which is depressed and slopes downwardly and forward to approximately centrally of its length and then slopes upwardly to the prow, the bottom at the centre and forward end curving upwardly from the keel.

HUGH MILTON WARNOCK.